United States Patent
Singh et al.

(10) Patent No.: US 9,792,006 B2
(45) Date of Patent: Oct. 17, 2017

(54) AUTOMATIC LIFECYCLE MANAGEMENT FOR PAGES ON A MOBILE APPLICATION

(71) Applicant: Microsoft Corporation, Redmond, WA (US)

(72) Inventors: Siddharth Singh, Redmond, WA (US); Nirav Y. Shah, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 342 days.

(21) Appl. No.: 14/256,283

(22) Filed: Apr. 18, 2014

(65) Prior Publication Data
US 2014/0229849 A1 Aug. 14, 2014

Related U.S. Application Data

(63) Continuation of application No. 13/248,034, filed on Sep. 29, 2011, now Pat. No. 8,745,539.

(51) Int. Cl.
*G06F 3/048* (2013.01)
*G06F 3/0484* (2013.01)
(Continued)

(52) U.S. Cl.
CPC .......... *G06F 3/0484* (2013.01); *G06F 9/4443* (2013.01); *G06F 9/461* (2013.01)

(58) Field of Classification Search
CPC ..... G06F 3/0481; G06F 3/0482; G06F 9/4443
(Continued)

(56) References Cited

U.S. PATENT DOCUMENTS

| 5,826,268 A | 10/1998 | Schaefer et al. |
| 6,973,625 B1 * | 12/2005 | Lupo .......................... G06F 8/38 715/744 |

(Continued)

FOREIGN PATENT DOCUMENTS

| CN | 101571800 A | 11/2009 |
| EP | 1445696 A2 | 8/2004 |
| WO | 2010111123 A2 | 9/2010 |

OTHER PUBLICATIONS

"First Office Action and Search Report Issued in Chinese Patent Application No. 201210378832.4", Mailed Date: Feb. 4, 2015, 15 Pages.

(Continued)

*Primary Examiner* — David Phantana Angkool
(74) *Attorney, Agent, or Firm* — Christopher J. Volkmann; Kelly, Holt & Christenson, PLLC

(57) ABSTRACT

User interface state (UI) information (such as UI control values) are stored and revived when the user navigates and returns to an application. When an instance of a page is created, the page registers with a tombstone list and indicates which page state information on the page is to be stored and revived when a user navigates away from the application. When the user provides an input indicating navigation away from the application, the application accesses the tombstone list and stores the UI page state information. UI page state information is stored in a page state dictionary data structure that corresponds to the current instance of the page. Then, when the user navigates back to the application, the application accesses the page state dictionary and restores the values of the UI page state information so that the user interface display is in the same state as when the user navigated away from the application.

20 Claims, 11 Drawing Sheets

(51) Int. Cl.
G06F 9/44 (2006.01)
G06F 9/46 (2006.01)
(58) Field of Classification Search
USPC .......................................................... 715/854
See application file for complete search history.

(56) References Cited

U.S. PATENT DOCUMENTS

| | | | |
|---|---|---|---|
| 7,188,183 | B1 | 3/2007 | Paul et al. |
| 7,210,121 | B2 | 4/2007 | Xia et al. |
| 7,240,296 | B1 | 7/2007 | Matthews et al. |
| 7,278,160 | B2 | 10/2007 | Black et al. |
| 7,596,766 | B1 * | 9/2009 | Sharma ............... G06F 3/04895 715/711 |
| 7,657,512 | B2 | 2/2010 | Fischer |
| 7,873,722 | B2 | 1/2011 | Paul et al. |
| 8,204,548 | B1 | 6/2012 | Blinn et al. |
| 8,391,935 | B2 | 3/2013 | Wickman et al. |
| 8,745,539 | B2 * | 6/2014 | Singh ................... G06F 3/0484 715/825 |
| 2003/0041264 | A1 | 2/2003 | Black et al. |
| 2006/0259367 | A1 | 11/2006 | Sattler et al. |
| 2007/0156649 | A1 | 7/2007 | Fischer |
| 2007/0214345 | A1 | 9/2007 | Fleming |
| 2008/0215733 | A1 | 9/2008 | Paul et al. |
| 2010/0017695 | A1 | 1/2010 | Palmieri |
| 2013/0086529 | A1 * | 4/2013 | Singh ................... G06F 9/4443 715/854 |

OTHER PUBLICATIONS

"Third Office Action Issued in Chinese Patent Application No. 201210376832.4", Mailed Date: Dec. 2, 2015, 12 Pages, No English Translation Available.

"Second Office Action and Search Report Issued in Chinese Patent Application No. 201210376832.4", Mailed Date: Aug. 26, 2015, 11 Pages, No English Translation Available.

"Decision on Rejection Issued in Chinese Patent Application No. 201210376832.4", Dated: Jun. 3, 2016, 12 Pages, No English Translation Available.

Liberty, Jesse, "iPhone to Windows Phone 7—Application LifeCycle and Tombstoning", Retrieved at <<http://jesseliberty.com/2010/09/22/iphone-to-windows-phone-7-application-lifecycle-and-tombstoning/>>, Sep. 22, 2010, pp. 11.

"Filthy Rich applications", Retrieved at <<http://blogs.adobe.com/ria/>>, Aug. 3, 2011, pp. 23.

Luke, "Tommbstoning with Windows Phone 7", Retrieved at <<http://mykindofphone.com/tombstoning-with-windows-phone-7->>, Aug. 9, 2010. pp. 5.

Justin, James., "Windows Phone 7 tombstoning explained", Retrieved at << http://www.techrepublic.com/blog/smartphones/windows-phone-7-tombstoning-explained/2789>>, May 24, 2011, pp. 2.

Application and drawings from U.S. Appl. No. 13/248,034, 34 pages.

Prosecution history from U.S. Appl. No. 13/248,034 including; non-final rejection mailed Oct. 7, 2013, response filed Jan. 3, 2014, and Notice of Allowance mailed Jan. 21, 2014, 23 pages.

"on Restore Instance State", Retrieved from: https://developer.android.com/reference/android/app/Activity.html#onRestoreInstanceState(android.os.Bundle), Retrieved on: Jan. 31, 2017, 5 pages.

Notice of Reexamination for Chinese Patent Application No. 201210376832,4 dated May 3, 2017, 11 pages.

"Activity", Retrieved from: https://developer.android.com/reference/android/app/Activity.html, Retrieved on: Jan. 31, 2017, 107 pages.

"on Restore Instance State", Retrieved from: https://developer.android.com/reference/android/app/Activity.html#onRestoreInstanceState(android.os.Bundle), Retrieved on: Jan. 31, 2017, 5 pages.

"The Activity Lifecycle", Retrieved from: https://developer.android.com/guide/components/activities/activity-lifecycle.html, Retrieved on: Jan. 31, 2017, 20 pages.

"Understanding Android API Levels", Accessed at: https://developer.xamarin.com/guides/android/application_fundamentals/understanding_android_api_levels/, accessed on Apr. 17, 2017, 15 pages. By submitting, Applicant does not affirm the accuracy of the contents therein.

https://android.googlesource.com/platform/frameworks/base/±/54b6cfa9a9e5b861a9930af873580d6dc20f773c, accessed on May 15, 2017 and bearing a date of Oct. 21, 2008, 173 pages.

https://android.googlesource.com/platform/frameworks/base/±/54b6cfa9a9e5b861a9930af873580d6dc20f773c/core/java/android/app/Activity.java, accessed on May 15, 2017 and bearing a date of 2006. The Android Open Source Project, 63 pages.

https://developer.android.com/about/versions/android-1.1.html, accessed on May 15, 2017 and bearing a date of Feb. 2009, 7 pages.
https://developer.android.com/sdk/older_releases.html, accessed on May 15, 2017, 6 pages.

* cited by examiner

AUTOMATIC LIFECYCLE MANAGEMENT FOR PAGES ON A MOBILE APPLICATION

CROSS-REFERENCE TO RELATED APPLICATION

The present application is a continuation of and claims priority of U.S. patent application Ser. No. 13/248,034, filed Sep. 29, 2011, the content of which is hereby incorporated by reference in its entirety.

BACKGROUND

Mobile devices are currently in wide use. Mobile devices include such things as cellular telephones, smart phones, personal digital assistants, multi-media players, other handheld and palmtop devices, and slate or tablet computers, to name a few. In mobile devices, battery life conservation is often addressed.

One way of addressing battery life conservation deals with the management of applications that are open on the mobile device. In particular, lifecycle management takes place in a scenario where the user opens an application and then navigates away from that application but does not expressly or explicitly close the application before navigating away. For instance, the user may open up a customer relations management application, and then momentarily navigate away from that application by opening another application, such as a contact list directory. When the user navigates away from the customer relations manager application, operating systems can handle the lifecycle management of the application that the user navigated away from, in different ways.

Due to battery lifecycle and memory management concerns, some operating systems may have simply killed the initial application (or closed it). However, this can present a number of problems. For instance, when the user eventually navigates back to the application, and the operating system re-launches the application, then the entire user interface information (such as the control values displayed on a page of the application) is lost.

In other words, when the user initially opened the application, the user may have entered user interface state information or control values into various controls. Such values can include, for example, checking or unchecking a check box, configuring a radio button, scrolling to a certain point in a scrollable list, among other things. When the user subsequently navigates away from the application, the operating system may simply kill the application. Therefore, when the user subsequently navigates back to the application, even though the operating system re-launches the application at that time, all of the user interface control states and values and other user interface state information for the displayed page are lost. Thus, the user is not coming back to the application in the exact same state it was in when the user left it. This does not leave the user's experience seamless and would require the user to navigate back in the application to the same place and re-enter all desired control values and state information which is undesirable and cumbersome.

The discussion above is merely provided for general background information and is not intended to be used as an aid in determining the scope of the claimed subject matter.

SUMMARY

One way to restore page state information (such as interface control values) on a page when the user navigates back to the application is to write event-driven logic on every page of the application. Then, when the user navigates away from the application, the control states and values on every page are stored so that they can be restored (or rehydrated) to the controls when the user navigates back to that application. However, this can incur a large test cost. Quality assurance personnel normally test each control on every page to ensure that they are acting properly. Therefore, if the controlled shutdown and restart process for saving control values is encoded into every page of an application, the developers must test that logic on every page to ensure that the controls are stored and revived properly.

In this description, user interface state (UI) information (such as UI control state information and values) are stored and revived when the user navigates and returns to an application. The functionality is incorporated into the application, instead of into code written for each page in the application. When an instance of a page is created, the page registers the controls it wants to tombstone with a tombstone list to indicate which page state information on the page is to be stored and revived when a user navigates away or comes back to the application. When the user provides an input indicating navigation away from the application, the application accesses the tombstone list and stores the state related information of every control present in the tombstoning list within a data structure called a tombstoner. Tombstoners are created based on the type of the control that is being tombstoned. All this UI page state information within the tombstoners is stored in a page state dictionary data structure that corresponds to the current instance of the page. Then, when the user navigates back to the application, the application accesses the page state dictionary and restores the values of the UI page state information from the tombstoners within the page state dictionary so that the user interface display is in the same state as when the user navigated away from the application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
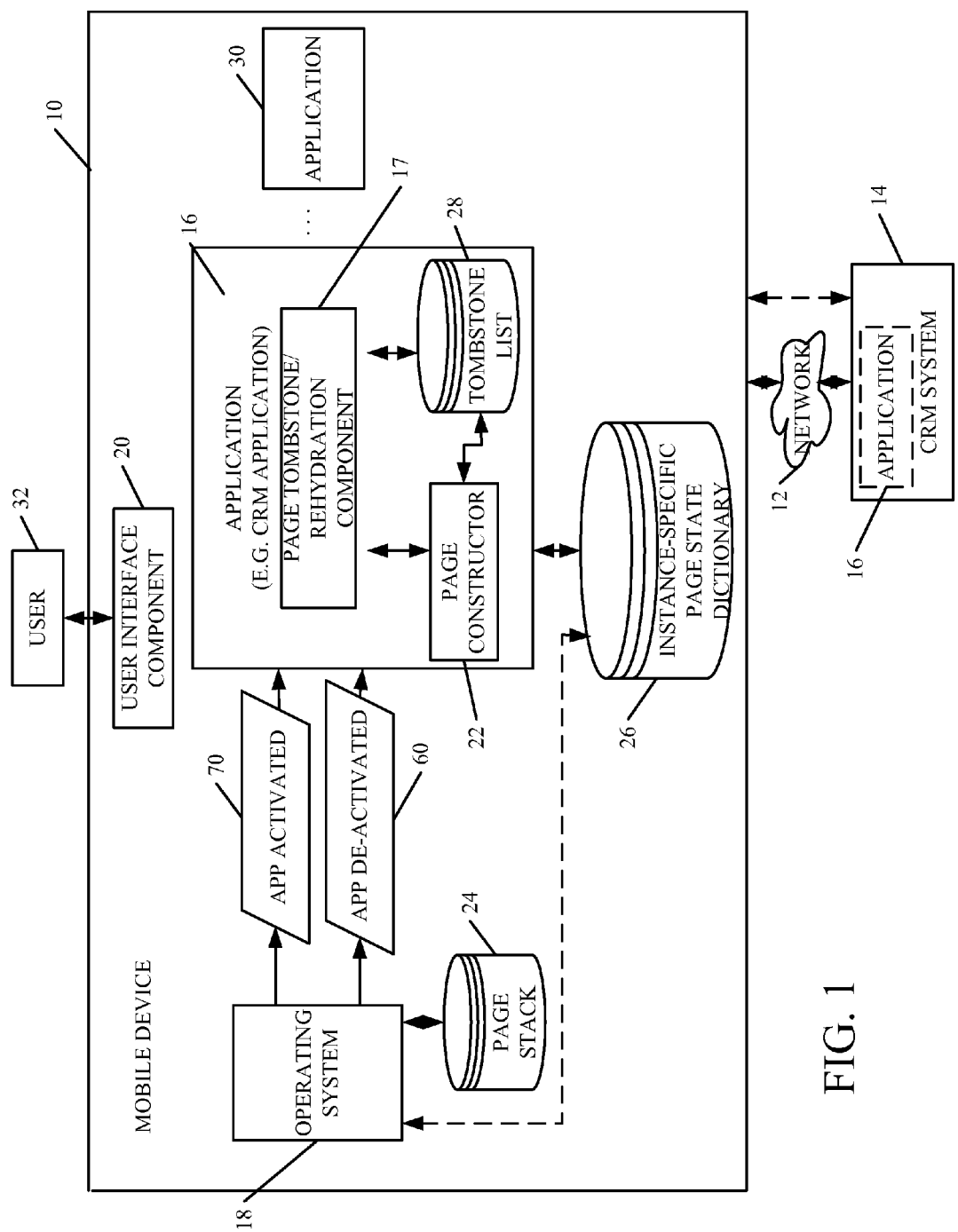
FIG. 1 is a block diagram of one illustrative mobile device.

FIG. 1 is a block diagram of a mobile device 10 that is shown connected, either directly or through network 12, to a customer relations management (CRM) system 14. In the embodiment shown in FIG. 1, mobile device 10 has an application 16 stored thereon which, itself, includes tombstone/rehydration component 17, constructor 22 and tombstone list 28. Application 16 will be discussed as being a CRM application, but it could be any other desired application as well. It will also be noted that application 16 can be located on CRM system 14 which provides access to it, as a service, through network 12. In that embodiment, application 16 is accessible to mobile device 10 using a cloud computing architecture. However, for purposes of the present, exemplary description, application 16 resides on mobile device 10.

FIG. 1 also shows that mobile device 10 illustratively includes operating system 18, user interface component 20, and a plurality of different data stores including page stack 24, and instance-specific page state dictionary 26. FIG. 1 also shows that mobile device 10 illustratively includes at least one other application 30, which is different than application 16.

Figure 7:
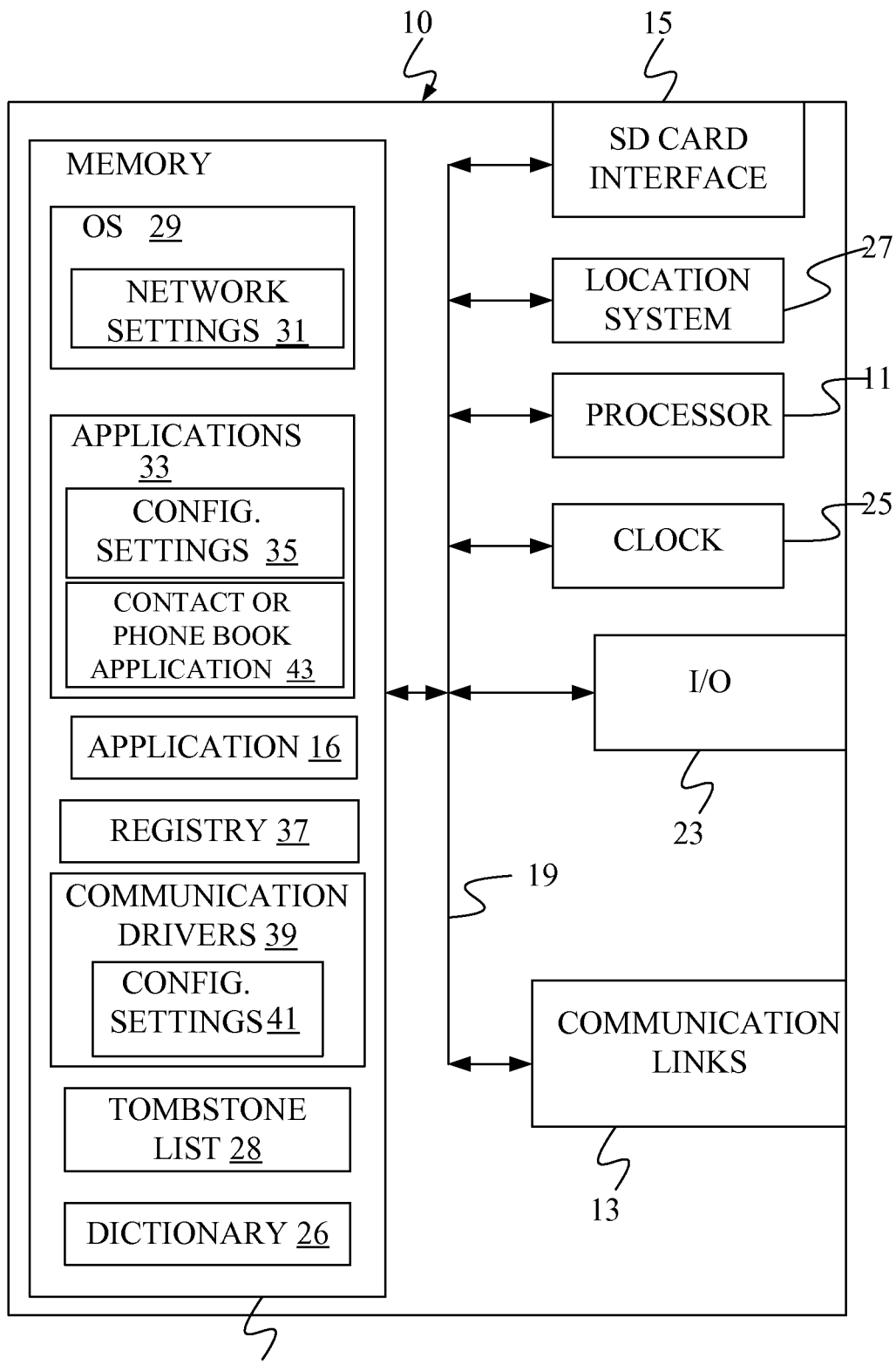
FIGS. 7-9 show various embodiments of mobile devices.
Figure 8:
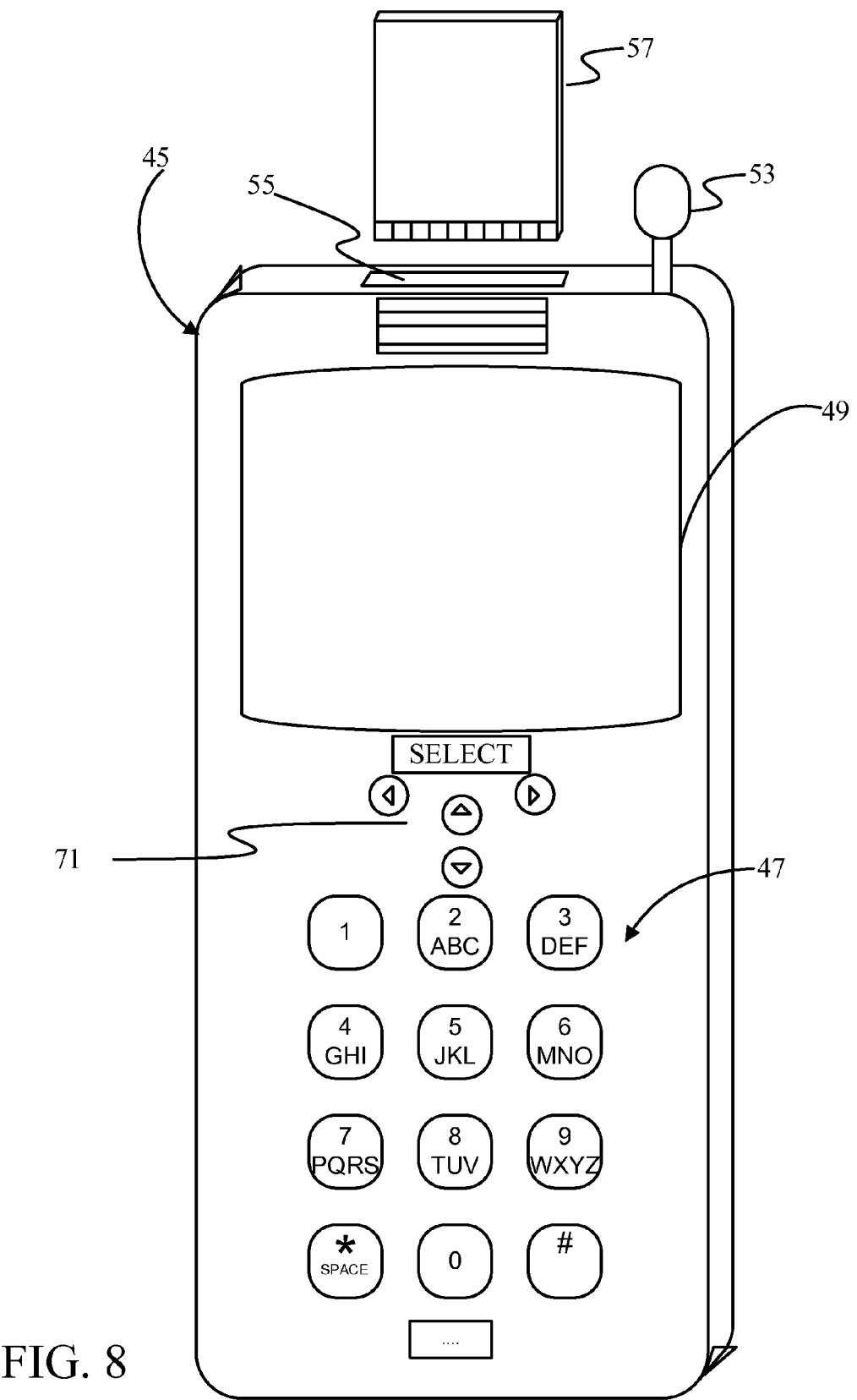
Figure 9:
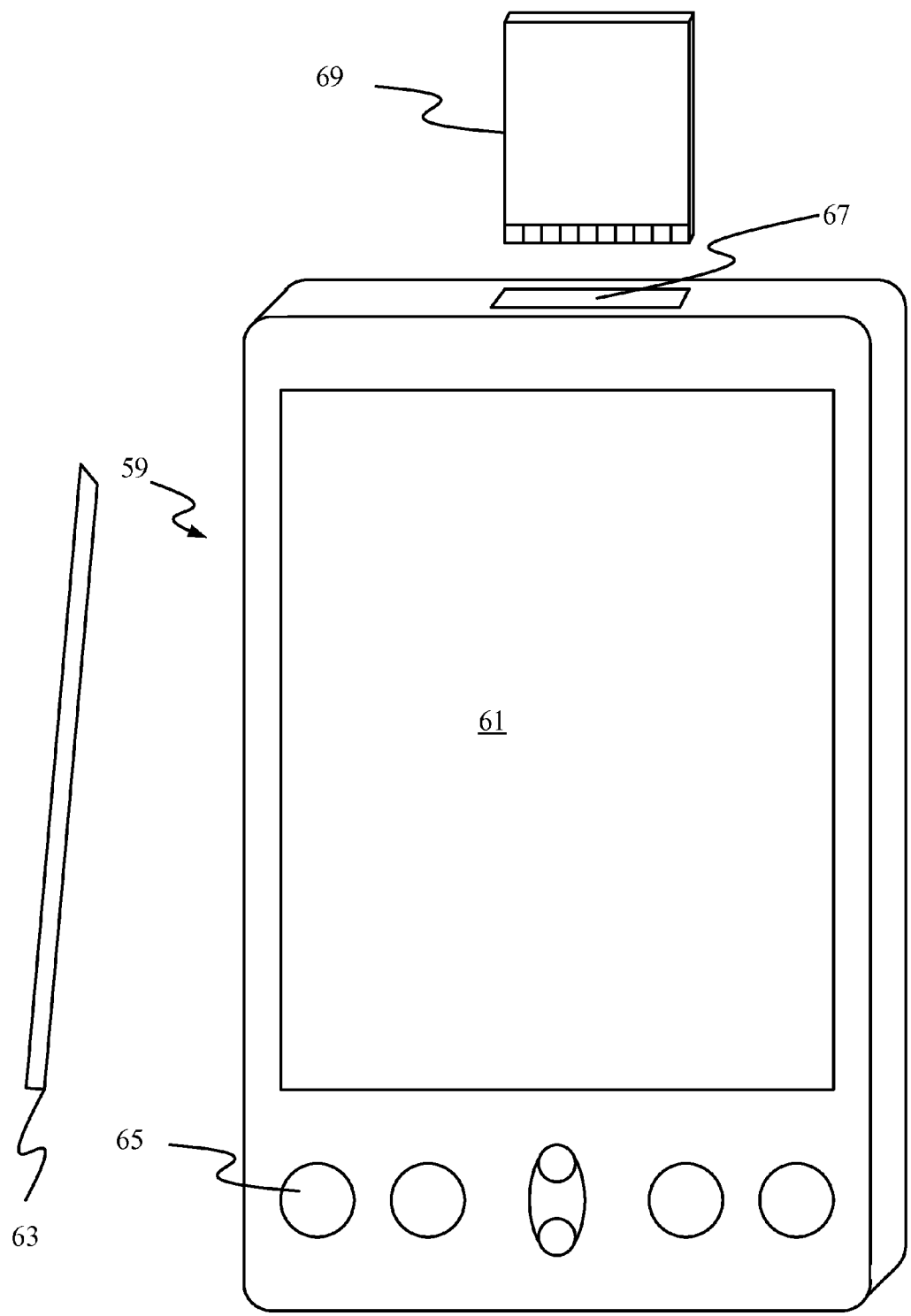

In one illustrative embodiment, application 16 generates user interface display pages that are displayed using user interface component 20 to user 32. FIGS. 7-9 show various embodiments of mobile device 10 using different mechanisms for generating user interface displays. Suffice it to say, for now, that the user interface displays can be generated on a display screen, a touch sensitive display screen, or any other type of display screen. User interface component 20 also illustratively includes mechanisms by which user 32 can enter information through graphical user interface elements (or control elements) on the user interface displays. For instance, user 32 may illustratively provide information through a keypad, through a soft keypad display generated on a touch sensitive screen, by using a point and click device to move a cursor over user interface elements and selecting them and entering desired information, using other buttons or actuators or touch sensitive keys, or other user input mechanisms.

Figure 1A:
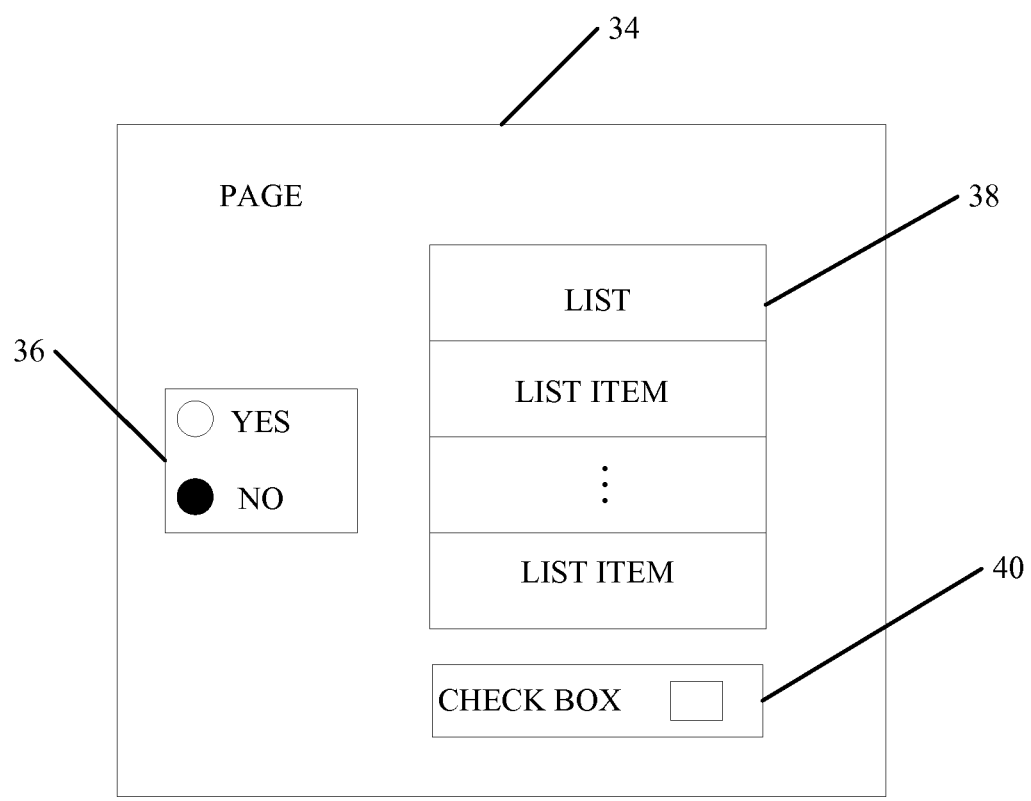
FIG. 1A shows an example of a number of controls on an application page.
Figure 2:
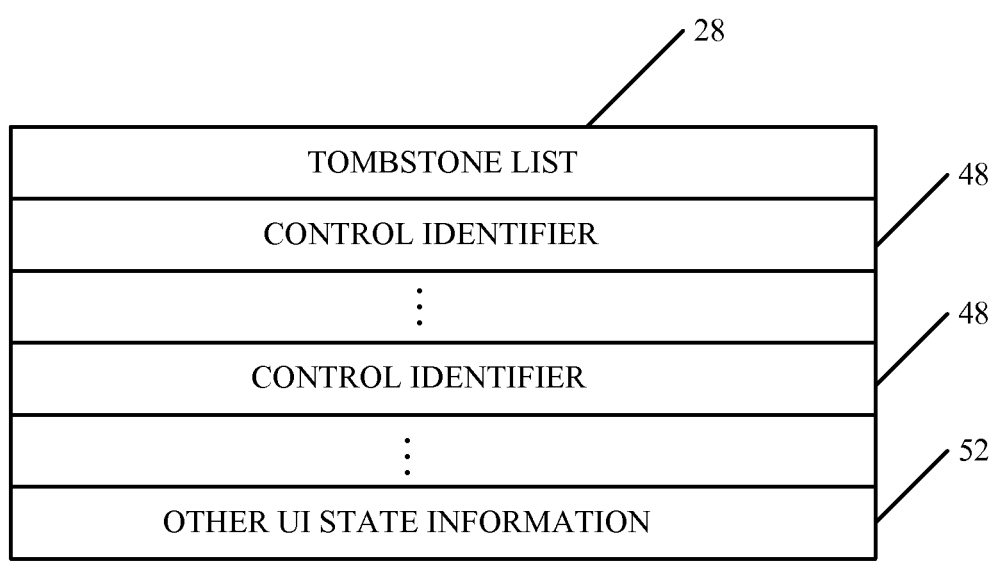
FIG. 2 shows one embodiment of a tombstone list.

In any case, application 16 illustratively generates user interface display pages such as display page 34 shown in FIG. 1A. Page 34 includes a plurality of different controls, such as controls 36, 38, and 40. In the embodiment shown in FIG. 1A, control 36 is a radio button that allows the user to select one of the options (in the example shown in FIG. 1A the options are "yes" and "no") by clicking over the circle located proximate the desired option. Control 38 is a list of elements through which the user can scroll. The user can then actuate a user interface element in order to select one of the items in the list 38. Control 40 is a check box that allows the user to check or uncheck a box to provide input information. Of course, a wide variety of other controls can be used as well, such as dropdown menus, text boxes, etc. Similarly, page 34 may have other user interface state information associated with it, other than simply the values for each of controls 36-40 generated on page 34. For instance, the page may have certain items therein which can be focused on by the user, such as by placing a cursor over those elements, or otherwise. Thus, the focus information (the particular area of page 34 under focus) is also user interface state information that can be associated with page 34. Thus, the user interface state information associated with page 34 is all of the information that defines the values associated with each of the controls thereon, or other information that defines the state of the user interface elements displayed on page 34.

Figure 3:
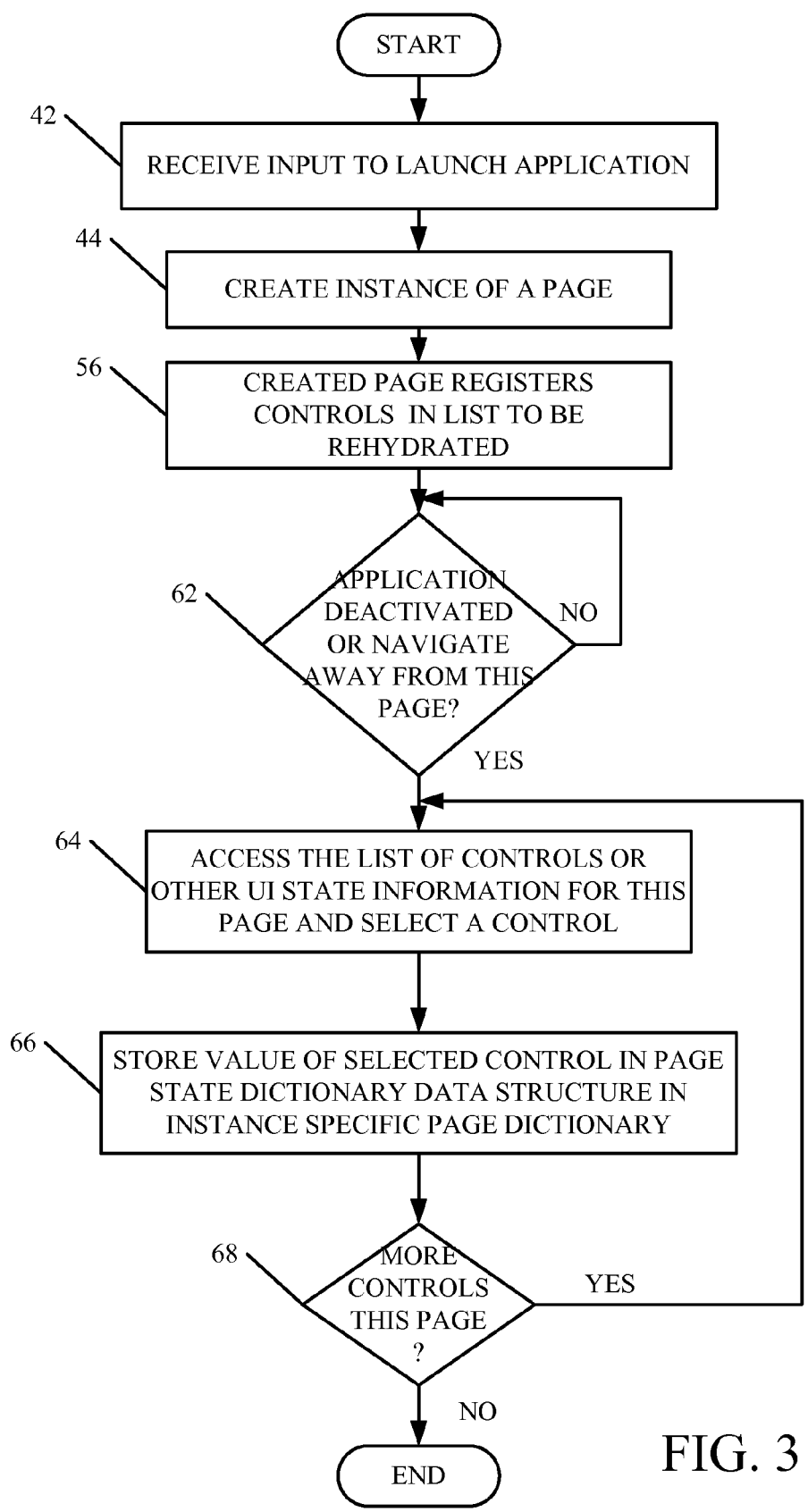
FIG. 3 is a flow diagram showing one embodiment of the operation of the system shown in FIG. 1 for storing user interface state information when a user navigates away from an application.

When application 16 generates page 34 using user interface component 20, and user 32 enters various values into controls 36-40, it may happen that the user wishes to launch another application, and navigate to the newly-launched application, without closing application 16. For instance, it may happen that application 16 is a CRM application that shows sales objects associated with various customers. When the user is using that application, the user may wish to momentarily launch and navigate to application 30, which may be a separate application. However, the user may not wish to close application 16, because the user may desire to navigate back to application 16. When that occurs, application 16 (and specifically component 17) saves (or tombstones) the user interface state information for page 34 (and other pages that are open in application 16) so that those pages can be restored (or rehydrated) to the same state that they existed in, when the user navigated away from application 16. FIG. 3 shows one embodiment of the operation of mobile device 10 in performing this function.

FIG. 3 shows that operating system 18 on mobile device 10 first receives a user input indicating that it is to launch an application, such as application 16. This may simply include the user actuating an icon corresponding to application 16, to launch the application. Receiving the input to launch the application is indicated by block 42 in FIG. 3. When application 16 is launched, it creates an instance of a page that is displayed to user 32 using user interface component 20. This is indicated by block 44 in FIG. 3.

The created instance of the page has built-in functionalities (such as tombstone/rehydration component 17) to tombstone and re-hydrate the controls that are registered for tombstoning. In one embodiment, every page in application 16 has its own constructor 22, although only one constructor 22 is shown in FIG. 1. When the page constructor 22 is called, it initializes the tombstoning list 28. This tombstoning list is held in memory within the application and is used in identifying the controls on the page that need tombstoning or rehydration. For instance, application 16 illustratively maintains a tombstone list that is used to identify pages and controls (or other UI page state information) on the user interface display of those pages, which are to be stored when the user navigates away from the application, so that they can be revived when the user navigates back to the application.

Figure 4:
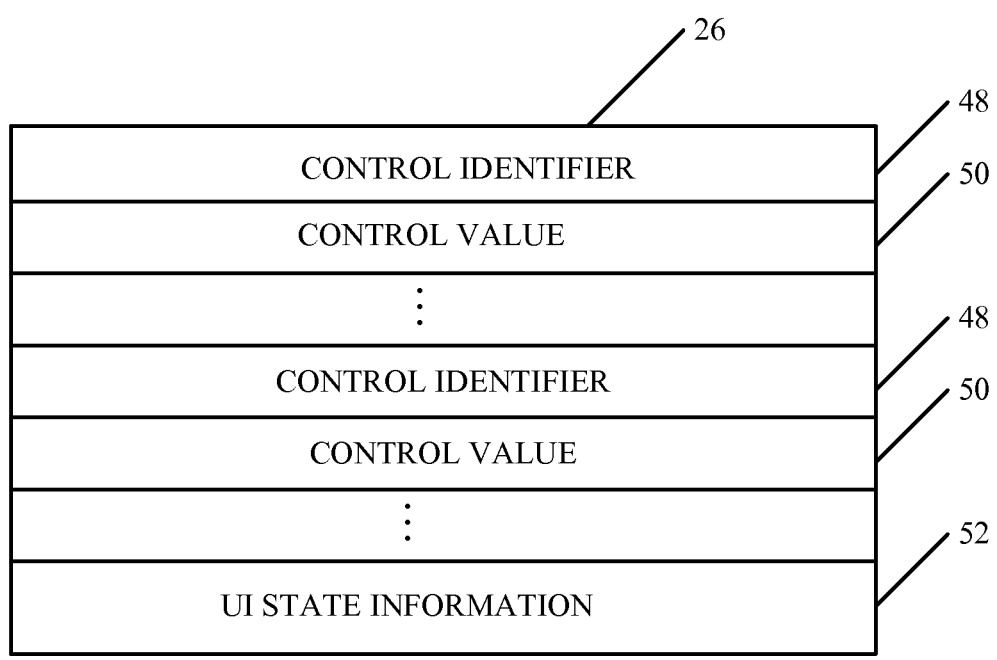
FIG. 4 shows one embodiment of an entry in a state dictionary.

FIG. 4 shows one embodiment of tombstone list 28. Tombstone list 28 is specific to every page within the application and so does not explicitly include a page identifier portion List 28 illustratively includes control identifier sections 48 which identify particular controls (or other UI page state information) on the page that are to be stored and revived. For instance, control identifier portions 48 may illustratively identify the type and identity of individual controls 36-40 shown in FIG. 1A for page 34.

Tombstone list 28, in one embodiment, contains only the controls that are to be tombstoned for a given page. If a control like a static label that does not need to be tombstoned is present on the page, then it may not be included in the list for tombstoning. If there is more than one control of the same type on the page that needs to be tombstoned then they are identified uniquely using a control identifier. For instance, if the radio button 36 is to be tombstoned, then control identifier 48 will identify control 36 as a radio button and have a particular identifier in case there is more than one radio button on page 34. By having the list for tombstoning, the application is able to indicate that the state of radio button 36 on this instance of page 34 is to be stored in case the user navigates away from application 16, so that it can be revived when the user navigates back to application 16. Having the created page 34 register the list with its constructor 22 so that the identity of the particular controls that are to be tombstoned are stored in tombstone list 28 is indicated by block 56 in FIG. 3.

Once page 34 is being displayed by application 16, and once it is registered in list 28, a number of things can happen that will affect the control of the tombstoning operation. For instance, the user may simply navigate away from page 34, to another page within application 16. In that case, operating system 18 or application 16 propagates an event, such as an OnNavigatedFrom( ) event to page 34.

In another scenario, operating system 18 may receive a user input indicating that the user wishes to launch another application, such as application 30, without closing application 16. In that case, operating system 18 sends an application de-activated message (item 60 shown in FIG. 1) to application 16. In either case (where page 34 receives an indication that the user is navigating away from it but still within application 16 or where the operating system has indicated that application 16 is to be deactivated) constructor 22 would have already accessed the tombstone list 28 for this particular instance of page 34 to identify the list of controls or other UI state information that is to be tombstoned (stored for revival) for this page, and one of those items of information (a control or another item of UI page state information) is selected from list 28. Receiving the indication that the user is navigating to a different application or a different page, and accessing the tombstone list 28 is indicated by blocks 62 and 64 in FIG. 3.

When tombstone/rehydration component 17 (e.g., the code to preserve the state of the control) is called for the control, it identifies the state of the selected control (or other UI page state information) and creates a data structure capable of storing all the relevant information of the type of the control and stores it in instance-specific page state dictionary 26. It should be noted that, in one embodiment, the instance-specific page state dictionary of every page is maintained by operating system 18. The page state dictionary 26 associated with every application page includes a data structure corresponding to each control registered for tombstoning on the given page in application 16 that has been opened and has been navigated away from. The data structure in dictionary 26 also illustratively includes control identifiers that identify each control on the corresponding page (and registered in list 28) and value portions that identify the values associated with each of those controls.

FIG. 4 shows one embodiment of a page state dictionary data structure 26. It can be seen that data structure 26 includes control identifier 48, which can be the same as those described above with respect to list 28. It identifies the particular UI state information saved for every control. Data structure 26 also illustratively includes control value portions 50 each of which corresponds to one of the control identifier portions 48. The control value portions 50 store the values indicative of the state of each of the controls 36-40 identified by the control identifier portions 48. For instance, if one control identifier portion 48 identifies radio button control 36 on page 34, then the control value portion 50 associated with that control will have a value of "no" indicating that the user has selected the "no" option in the radio button 36. This information is stored for each of the controls on page 34 that the application 16 wishes to revive in case the user navigates away from, and then back to, the present application. Of course, data structure 26 can include other UI state information corresponding to page 34, that application 16 desires to restore as well. In addition, there may be more than one control value associated with each control. All this other UI state information can be captured by storing one control or the other that is registered in the list for tombstoning.

To save information to data structure 26, the tombstone/rehydration component 17 obtains the value of each control on page 34 that is registered in list 28 and stores it along with its corresponding control identifier in the data structure 26 which gets stored in the page state dictionary. This is indicated by block 66 in FIG. 3.

The tombstone/rehydration component 17 is called upon all the controls specified in the list for tombstoning. So it then determines whether there are more controls on this page (e.g., page 34) that are to be stored and if so, processing reverts to block 64. The component 17 identifies the remaining controls, from list 28, for which values need to be saved and saves those control values to the instance-specific page state dictionary 26 for the current instance of page 34. This is indicated by block 68 in FIG. 3.

Processing continues in this way until all of the UI page state information registered in list 28, for this instance of this page 34, has been stored in the instance-specific page state dictionary data structure 26 for this page. Once this is completed, all the necessary UI state information has been stored so that it can be restored to this page if the user desires to navigate back to this page.

Figure 5:
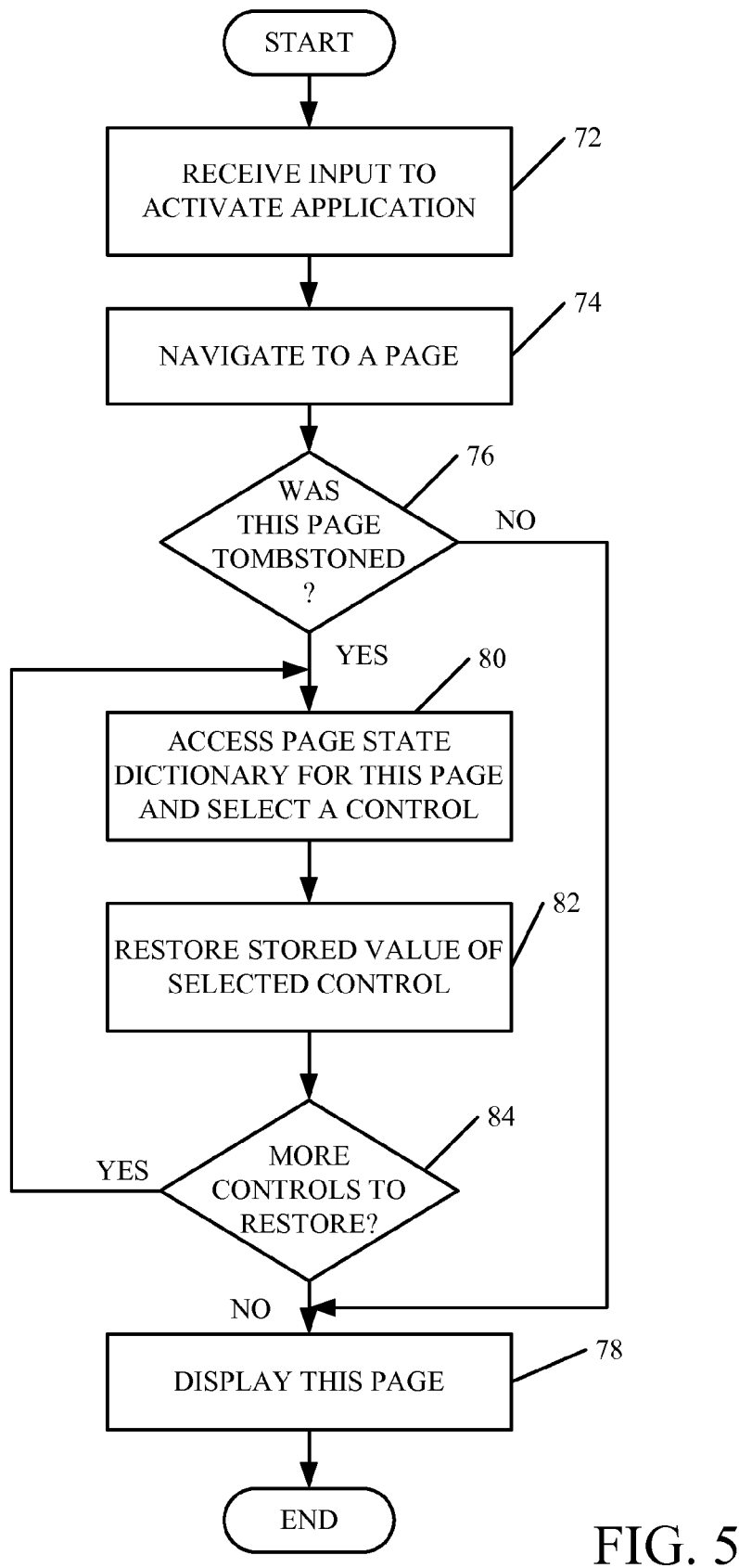
FIG. 5 is a flow diagram illustrating one embodiment of the operation of the system shown in FIG. 1 for reviving a user interface when a user navigates back to an application.

FIG. 5 shows one embodiment of a flow diagram indicating how application 16 and the tombstone/rehydration component 17 revive the UI state information for a given page 34, when the user desires to navigate back to that page, after having navigated away from it. First, operating system 18 illustratively receives an input from user 32 through user interface component 20 indicating that the user wishes to navigate back to page 34 of application 16. For instance, where the user has navigated to application 30, and the user now hits the back button, or closes application 30, operating system 18 then sends an "application activated" message 70 to application 16, indicating that it is being re-activated. Operating system 18 illustratively saves a page stack 24 of pages that are open, and navigated away from, but not yet closed, by the user. Thus, operating system 18 knows which page to navigate to, based on the user input, and retrieves that page from page stack 24. Receiving the user input and navigating to the desired page is indicated by blocks 72 and 74 in FIG. 5.

When the user navigates back to page 34, the page receives an event indicative of this. For instance, the page may receive an "OnNavigatedTo ( )" event indicating that the user 32 has navigated to page 34. At this point, page 34 is not aware of whether the user is simply navigating back to this page from within application 16, or whether the user has left application 16 in the meantime, and the page has been tombstoned (stored for revival). The page's constructor 22 and the inherited tombstone/rehydration component 17 are used to determine whether it has been tombstoned. If the user has never left application 16 (and page 34 has thus not been tombstoned), then the user interface state information is already automatically maintained and nothing needs to be done. The application 16 simply displays the desired page as indicated at block 78. If the user had navigated away from application 16, then page 34 has been tombstoned, and the UI page state information needs to be restored to the user interface page before showing it to the user. Making this determination is indicated by block 76 in FIG. 5.

If, at block 76, it is determined that the page 34 was tombstoned, then the list for tombstoning is accessed and then from the instance-specific page state dictionary 26 the data structures corresponding to the controls on this instance of page 34 are pulled out and then they are rehydrated. Recall that the data structure is identified using the identifier of the control that was tombstoned, and it contains the user interface value along with state information corresponding to that control. Thus, the tombstone/rehydration component 17 accesses the page state dictionary for this instance of page 34 and selects one of the controls for revival. This is indicated by block 80 in FIG. 5.

Component 17 then extracts the user interface state information for the selected control and restores that value to the control on page 34 for display to the user. This is indicated by block 82.

Component 17 then determines whether page 34 has more controls (or other UI page state information) that needs to be restored. This is done by simply traversing the list of controls registered for tombstoning. This is indicated by block 84. If so, processing continues at block 80 where the next control is selected, and at block 82, where the user interface state information corresponding to that control is restored to the display of page 34. If, however, component 17 has restored all the values from the page state dictionary 26 for the current page, then the page is simply displayed as indicated at block 78.

It should be noted that during use, the user may have navigated to a level multiple pages deep within application 16. Each time the user navigates away from one of those pages to a page at the next level deep within application 16, recall that the page receives an "OnNavigatedFrom( )" event and stores the values of UI page state information in a page state dictionary 26, as indicated by blocks 62-68 in FIG. 3. Therefore, even if the user then navigates away from application 16 and returns to application 16, and then navigates back up the levels to different pages within application 16, all of the UI page state information corresponding to that stack of pages is stored in different page state dictionaries of each page 26, with one of the data structures corresponding to each of those controls registered for tombstoning on the pages. By way of example, if the user is three levels deep in application 16 (and on page 34) and navigates to application 30 and then back to application 16, the user will see page 34 with the same UI state information displayed on it as when the user left. Then, if the user navigates up one level (still within application 16) the page for that level will be restored in the same way as described above with respect to FIG. 5 so that the user will see that page with all of the same UI state information from when the user initially navigated away from it. This can continue regardless of how many levels deep the user has navigated into application 16.

Figure 6:
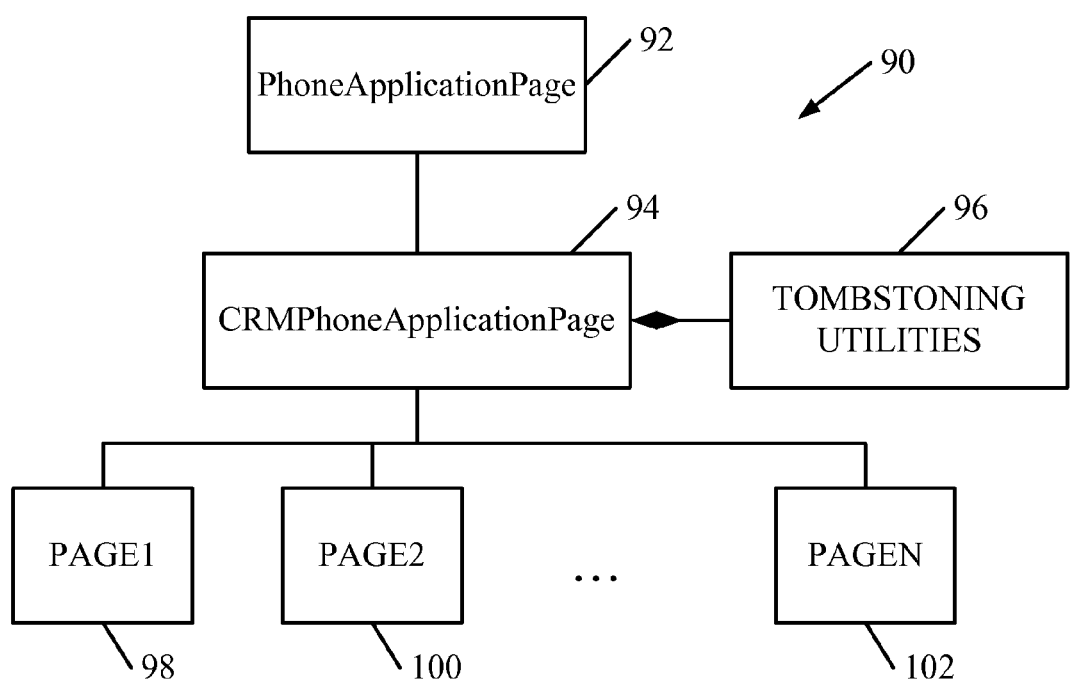
FIG. 6 is one embodiment of a class diagram used to generate specific pages in an application.

FIG. 6 is one illustrative embodiment showing a class diagram 90 of entities that can be employed to store and revive pages. In the embodiment shown in FIG. 6, class diagram 90 includes a base class PhoneApplicationPage 92. The class diagram 90 also shows that a specific subclass of PhoneApplicationPage 92, related to the given application, derives from PhoneApplicationPage 92. In the embodiment shown in FIG. 6, because application 16 is illustratively a CRM application, CrmPhoneApplicationPage 94 derives from PhoneApplicationPage 92, and thus includes all of the functionality of PhoneApplicationPage 92. CrmPhoneApplicationPage 94 has, associated with it, tombstoning utilities entity 96. The CrmPhoneApplicationPage also contains some tombstoning event handling logic. This logic primarily walks the list of controls registered for tombstoning and calls the application programming interfaces from tombstoning utilities 96 to tombstone or rehydrate the controls. The functionality for storing and reviving pages discussed above can be performed by accessing tombstone utilities entity 96. However, the page created from CrmPhoneApplicationPage does not need to know about these utilities. Once the controls are registered for tombstoning in the constructor, the logic in CrmPhoneApplicationPage takes care of the handling for tombstoning and rehydration. FIG. 6 also shows a number of specific page classes 98, 100 and 102 illustrating that all of the specific pages for application 16 derive from CrmPhoneApplicationPage 94. In one exemplary embodiment, CrmPhoneApplicationPage 94 includes all of the logic for storing and rebuilding pages 98-102 (by its association with tombstoning utilities entity 96) and thus all of pages 98-102 include this logic as well. Thus, the logic required to store and rebuild the pages 98-102, when the user navigates away from and back to application 16, is already within the pages 98-102. Tombstoning utilities 96 illustratively preserves and restores the state of each of the controls. That is, CrmPhoneApplicationPage 94 accesses these utilities in order to walk through the list 28 of controls that pages 98-102 have registered with it and store the values in the page state dictionaries 26 associated with each of the pages and then restore the values of each of the user interface states when the user navigates back to application 16 and to the specific page. This can be advantageous over encoding logic on each individual page. It can greatly reduce testing costs and time. For instance, the developer or designer need only test the functionality in the super class CrmPhoneApplicationPage or tombstoning utilities entity 96 and need not test it on every page 98-102. If the functionality works in the super class or utilities class, it will work on all pages that derive therefrom.

FIG. 7 is a simplified block diagram of one illustrative embodiment of a handheld or mobile computing device 10 in which the present system can be deployed. FIGS. 8 and 9 are examples of handheld devices.

FIG. 7 provides a general block diagram of the components of a device 10 that runs or accesses CRM application 16. In the device 10, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), 1xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, application 16 (or any other application) is received on a removable Secure Digital (SD) card that is connected to a SD card interface 15. SD card interface 15 and communication links 13 communicate with a processor 11 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 10 can include input components such as buttons, touch sensors, touch screens, proximity sensors, microphones, tilt sensors, and gravity switches and output components such as display device 26, a speaker, and or a printer port. Other I/O components 23 can be used as well.

Clock 25 illustratively comprises a real time clock component that outputs a time and date. It can also, illustratively, provide timing functions for processor 11.

Location system 27 illustratively includes a component that outputs a current geographical location of device 18. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33 (which can include applications 16 and 30), application configuration settings 35, registry 37, communication drivers 39, communication configuration settings 41, list 28 and dictionary 26. Memory 21 can include all types of tangible volatile and non-volatile computer-readable memory devices. Memory 21 stores computer readable instructions that, when executed by processor 11, cause the processor to perform computer-implemented steps or functions according to the instructions. Client CRM system 24, for example, can reside in memory 21.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 10 or applications that are installed during use. In one embodiment, applications 33 include contact or phonebook application 43, application 16 and application 30 although portions of these can be part of operating system 29, or hosted external to device 10, as well.

FIGS. 8 and 9 provide examples of handheld devices that can be used as device 10, although others can be used as well. In FIG. 8, a smart phone or mobile phone 45 is provided as the device 10. Phone 45 includes a set of keypads 47 for dialing phone numbers, a display 49 capable of displaying images including application images, icons, web pages (e.g., page 34), photographs, and video, and control buttons 71 for selecting items shown on the display. The phone includes an antenna 53 for receiving cellular phone signals such as General Packet Radio Service (GPRS) and 1×rtt, and Short Message Service (SMS) signals. In some embodiments, phone 45 also includes a Secure Digital (SD) card slot 55 that accepts a SD card 57.

The device of FIG. 9 is a personal digital assistant (PDA) 59 which can also be a tablet or slate computing device or multimedia player (collectively referred to herein as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, PDA 59 also includes a SD card slot 67 that accepts a SD card 69.

Note that other forms of the devices 10 are possible. Examples include tablet or slate computers, music or video players, and other handheld or mobile computing devices.

It will also be noted that as shown in FIG. 1, application 16 and associated memory and functionality can reside elsewhere, other than on client device 10. While the embodiment of FIG. 1 shows that application 16 resides on client device 10, it could be embodied elsewhere as well, such as in a cloud computing environment. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Business software (such as some components of application 16) as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the functions described herein can be provided from a service provider at a remote location using a cloud computing architecture. Alternatively, they can be provided from a conventional server, or they can be installed on client device 18 directly.

Figure 10:
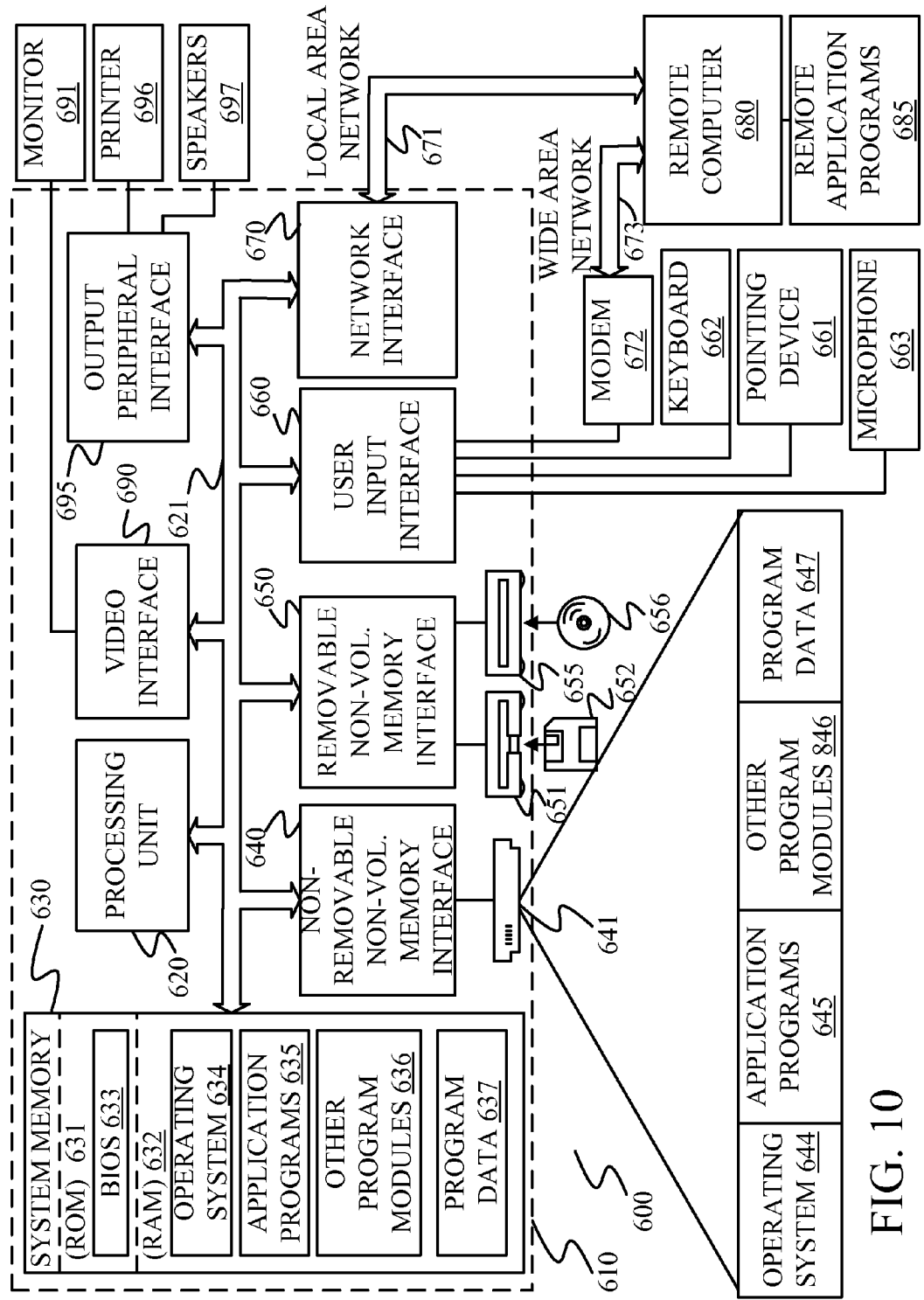
FIG. 10 is a block diagram of one illustrative computing environment that can be used.

FIG. 10 is one embodiment of a computing environment in which the invention can be used. For instance, components of system 10 or system 14 can be implemented in this, or another, environment. With reference to FIG. 10, an exemplary system for implementing some embodiments includes a general-purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, hardware, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 can be used for the various data stores shown in FIG. 1, or they can be implemented elsewhere. System memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 10 illustrates operating system 634, application programs 635, other program modules 636, and program data 637.

The computer 610 may also include other removable/non-removable volatile/nonvolatile computer storage media. By way of example only, FIG. 10 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 10, provide storage of computer readable instructions, data structures, program modules and other data for the computer 610. In FIG. 10, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies.

A user may enter commands and information into the computer 610 through input devices such as a keyboard 662, a microphone 663, and a pointing device 661, such as a mouse, trackball or touch pad. Other input devices (not shown) may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 is operated in a networked environment using logical connections to one or more remote computers, such as a remote computer 680. The remote computer 680 may be a personal computer, a hand-held device, a server, a router, a network PC, a peer device or other common network node, and typically includes many or all of the elements described above relative to the computer 610. The logical connections depicted in FIG. 10 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 10 illustrates remote application programs 685 as residing on remote computer 680. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
generating an instance of a user interface page, for an application, on a mobile device;
registering an identification of page state information in a data structure, the page state information corresponding to the instance of the user interface page;
receiving an indication of a request to navigate away from the instance of the user interface page for the application;
based on the instance of the user interface page, storing values, for the page state information registered in the data structure, wherein the values are stored in an instance-specific data structure corresponding to the instance of the user interface page;

receiving an indiction of a request to navigate back to the instance of the user interface page of the application;

based on the indiction of the request to navigate back to the instance of the user interface page, accessing the instance-specific data structure corresponding to the instance of the user interface page; and generating the instance of the user interface page using the values for the page state information stored in the instance-specific data structure.

2. The computer-implemented method of claim 1 and further comprising:

prior to generating the instance of the user interface page, launching the application.

3. The computer-implemented method of claim 1 wherein generating the instance of the user interface page comprises:

requesting registration of predefined page state information for which the values are to be stored, wherein the registration is requested using functionality corresponding to a class of pages from which the instance of the user interface page derives.

4. The computer-implemented method of claim 3 wherein requesting registration of predefined page state information comprises:

requesting registration of predefined controls on the instance of the user interface page.

5. The computer-implemented method of claim 1 wherein the identification of page state information stored in the data structure comprises an identification of items of user interface page state information, each of which has an associated state and value, corresponding to the instance of the user interface page.

6. The computer-implemented method of claim 5 wherein storing values for the page state information registered in the data structure comprises:

accessing the data structure and selecting one of the items identified in the data structure;

obtaining from the instance of the user interface page, the state and value associated with the selected item; and storing the state and value associated with the selected item in the instance-specific data structure corresponding to the instance of the user interface page.

7. The computer-implemented method of claim 1 and further comprising:

prior to accessing the instance-specific data structure,
determining whether the application was navigated away from or was suspended because the mobile device was locked since a last time the instance of the user interface page was displayed; and based on the determination, accessing the instance-specific data structure to retrieve the values for the page state information.

8. The computer-implemented method of claim 1, wherein the instance of the user interface page comprises a first user interface page for the application, and the data structure comprises a first data structure, the method further comprising:

prior to receiving a request to navigate away from the application, receiving a request to navigate to a second user interface page for the application, from within the first user interface page; and storing the values for the page state information registered in the first data structure, for the first user interface page, in response to the request to navigate to the second user interface page.

9. A mobile device, comprising:

a processor; and memory storing instructions executable by the processor, wherein the instructions configure the mobile device to:

generate with first and second user interface pages for an application, wherein each of the first and second user interface pages comprises storage and revival functionality for storing and reviving user interface page state information corresponding to the respective user interface page;

receive an indication of a request to navigate away from the application;

based on the indication of the request to navigate away from the application, storing user interface page state information from one of the first or second user interface page, that is open in the application;

receive in an indication of a request to navigate back to the application; and based on the indication of the request to navigate back to the application, restoring the stored user interface page state information to the one of the first or second user interface page.

10. The mobile device of claim 9, wherein the first and second user interface pages derive from a page class associated with a utilities entity that has the storage and revival functionality, the first and second user interface pages inheriting the storage and revival functionality of the page class.

11. The mobile device of claim 10 wherein the application comprises a business related application.

12. The mobile device of claim 11 wherein the application comprises a customer relations management application.

13. The mobile device of claim 9 and further comprising:

a data store storing a list wherein, for each respective page of the first and second user interface pages, the storage and revival functionality is configured to register all types of page state information that are to be stored and retrieved for the respective page when the respective page is created.

14. The mobile device of claim 13 and further comprising:

a page state dictionary data store configured to store an instance-specific state dictionary, wherein, for each respective page of the first and second user interface pages, the storage and revival functionality is configured to execute a storage function when the instance of the respective page is navigated away from, wherein the storage function comprises accessing the list and storing current page state values corresponding to each type of page state information for the instance of the respective page.

15. The mobile device of claim 14 wherein, for each respective page of the first and second user interfaces pages, the storage and revival functionality is configured to:

execute a retrieval function by accessing the list and retrieving from the instance-specific state dictionary the current page state values corresponding to each type of page state information for the instance of the respective page and restore the retrieved current page state values to the instance of the respective page when the application navigates back to the instance of the respective page.

16. The mobile device of claim 15 wherein, for each respective page of the first and second user interface pages, the storage and revival functionality is configured to:

execute the revival function for the instance of the respective page only if the application has been navigated away from since the storage function was performed for the respective page.

17. The mobile device of claim 9 wherein the first and second user interface pages each have controls thereon that have control values that are configured to be set based on an indication of user input, and wherein the user interface page state information comprises the control values.

18. A hardware computer readable storage medium, storing computer readable instructions which, when executed by a computer, cause the computer to perform steps comprising:
- generating an instance of a user interface page, for an application, for display on a mobile device;
- registering an identification of page state information types in a data structure, the page state information types corresponding to the instance of the user interface page;
- receiving an indication of a request to navigate away from the instance of the user interface page for the application;
- based on the instance of the user interface page, storing page state values, for the page state information types registered in the data structure, wherein the page state values are stored in an instance-specific data structure corresponding to the instance of the user interface page;
- receiving an indication of a request to navigate back to the instance of the user interface page of the application;
- based on the indication of a request to navigate back to the instance of the user interface page, accessing the instance-specific data structure corresponding to the instance of the user interface page;
- retrieving the page state values stored in the instance-specific data structure;
- restoring the retrieved page state values to the instance of the user interface page; and
- generating the instance of the user interface page using the restored page state values from the instance-specific data structure.

19. The hardware computer readable storage medium of claim 18, the steps further comprising:
- determining whether the computer has navigated away from the application; and
- obtaining the page state values only if the computer has navigated away from the application.

20. The hardware computer readable medium of claim 19 wherein determining whether the computer has navigated away from the application, comprises:
- determining whether the application has received a command from an operating system to deactivate the application.

* * * * *